United States Patent [19]
Mosch et al.

[11] Patent Number: 5,299,044
[45] Date of Patent: Mar. 29, 1994

[54] RANGING METHOD FOR USE IN TDMA SYSTEMS ON TREE-AND-BRANCH OPTICAL NETWORKS

[75] Inventors: Theo W. M. Mosch, Huizen; Pieter H. van Heyningen, Almere, both of Netherlands

[73] Assignee: AT&T Bell Laboratories, Murray Hill, N.J.

[21] Appl. No.: 933,795

[22] Filed: Aug. 24, 1992

[51] Int. Cl.[5] .................. H04B 10/08; H04B 10/18; H04B 10/12
[52] U.S. Cl. .................................. 359/110; 359/153; 359/158; 359/161; 359/189; 359/137
[58] Field of Search ............... 359/110, 124, 132, 137, 359/140, 153, 154, 158, 159, 161, 189; 370/95.3, 74, 76, 98, 108; 375/107, 108; 342/127

[56] References Cited

U.S. PATENT DOCUMENTS

| | | | |
|---|---|---|---|
| 4,499,600 | 2/1985 | Powell et al. | 370/98 |
| 4,982,446 | 1/1991 | Lord et al. | 359/158 |
| 5,077,729 | 12/1991 | Wong | 359/110 |

*Primary Examiner*—Wellington Chin
*Attorney, Agent, or Firm*—Henry T. Brendzel

[57] ABSTRACT

In a passive optical tree-and-branch network, which utilizes the Asynchronous Transfer Mode (ATM) transmission format, a superimposed low-level, single frequency, ranging signal is used to determine the distance between an Optical Line Termination (OLT) node and any Optical Network Termination Node (ONT) of the network. In one embodiment of the invention, this ranging frequency is a low frequency signal that is superimposed on top of the transmitted data signal from the OLT. This ranging signal is returned to the OLT from a particular ONT upon the issuance of a ranging command from the OLT. The phase difference between the transmitted ranging signal and the received ranging signal is proportional to the distance between the OLT and that particular ONT. In a second embodiment of the invention, the ranging signal is a high frequency signal that is superimposed on top of the transmitted data signal from the OLT. This ranging signal is returned to the OLT from a particular ONT upon the issuance of a ranging command from the OLT. The time between issuance of the ranging command and reception from that particular ONT of the ranging signal is proportional to the distance between the OLT and the ONT.

28 Claims, 3 Drawing Sheets

RANGING METHOD FOR USE IN TDMA SYSTEMS ON TREE-AND-BRANCH OPTICAL NETWORKS

BACKGROUND OF THE INVENTION

The present invention relates to optical communications networks. In particular, this invention relates to the use of a passive tree-and-branch optical fiber network that employs Time Division Multiple Access (TDMA) in a telephone subscriber loop environment.

In the past ten years optical transmission systems have more and more taken over the functions of their copper counterparts in the trunk network between central offices. However, plain replacement of copper based transmission in the trunk network by optical fiber based transmission is only the first step in the utilization of the large transmission capabilities of optical fibers. Indeed, deployment of optical fibers will penetrate further to the local loop plant to bring broad-band and narrow-band services directly to customers.

Currently, one area of investigation in optical loop plants involves the use of a passive optical network in which physical access to the medium is controlled by TDMA techniques and information transfer takes place using the Asynchronous Transfer Mode (ATM) transmission format. This passive optical network uses a tree-and-branch network topology to implement the local loop which interconnects customers to the central office. In particular, each customer station, or optical network termination (ONT) node, is connected via the same optical fiber to an optical line termination (OLT) node of the central office. The OLT of the central office centrally controls the information flow to, and from, the various ONTs using TDMA techniques. In particular, the OLT assigns TDMA time slots, which are used by the ATM transmission format. Information that flows from the OLT to each of the various ONTs is considered to be a "downstream" information flow and, conversely, information that flows from each ONT to the OLT is considered to be an "upstream" information flow.

Generally speaking, the ATM transmission format is based on a frame of information, where each frame includes a number of "cells" and where each ATM cell carries specific information within a particular TDMA time slot. Each ONT receives the entire downstream ATM frame via a representative optical signal transmitted from the OLT. However, the ATM transmission format allows for ATM cells to be individually assigned to an ONT so that even though each ONT receives the entire ATM frame, it only selects those ATM cells to which it is assigned and ignores the others. In addition, each ONT synchronizes its clock to the received optical signal.

In the upstream direction, as mentioned above, each ONT similarly transmits information in its assigned ATM cells under the control of the OLT of the central office. Unfortunately, this situation is more complicated because, although this is a subscriber loop network where the distance between each ONT and the OLT is relatively short, the transmit time of information traveling through the optical fiber is not negligible. Consequently, in order to prevent collisions at the OLT, each ONT not only has to know which TDMA time slot to put the ATM cells into but also must know when to put its information-bearing ATM cells onto the network. In other words, each ONT must compensate for the different optical path lengths in the network. This synchronization of the ONTs is accomplished by a "ranging function" implemented within the OLT. This ranging function estimates the distance, or time delay, from the OLT to each ONT.

The ranging procedure to get all ATM cells in line at the OLT side can be further divided into "static ranging" and "dynamic ranging." Static ranging is usually done initially and every time when a new customer is connected to the network (and automatically in case of a failure). This static ranging is generally done in two steps: "coarse" ranging yielding a resolution of a few ATM cells and "fine" ranging yielding a resolution of a few bits. Dynamic ranging is usually performed (quasi) continuously to overcome delay variations in the optical network and electronics, e.g., due to temperature changes. The goal of the whole ranging process is to obtain virtually identical OLT-ONT distances for each ONT in the network. Once differences in OLT-ONT distances are determined in the static ranging procedure and delay times have been installed at each of the ONTs, upstream information transfer is allowed to begin. A dynamic fine ranging procedure is usually done by monitoring the gaps between received ATM cells at the OLT side. The delay is adjusted when the gap between ATM cells becomes too large or too small.

One method to determine the range from the OLT to each ONT is to create a large idle TDMA time slot in which no transmission of user information can take place. In particular, the OLT sends a ranging instruction, or message, to a particular ONT, which then immediately sends back a ranging cell to the OLT. The OLT measures the delay between when it sent the ranging instruction and the ONT's response and calculates the distance to that particular ONT and therefrom the amount of time delay to be installed at that ONT. During this ranging procedure, all the other ONTs must remain silent, i.e., they cannot transmit any information.

Another method to determine the range from the OLT to each ONT makes use of auto-correlation techniques and is performed in two steps. In the first step, a coarse ranging estimate is determined by the use of a superimposed low-level, low frequency, digital ranging signal on the high frequency bit stream to the OLT. This digital ranging signal represents a digital sequence, or bit pattern, that is recognizable by the OLT. At the start of the ranging procedure, the OLT requests the ONT to transmit the digital ranging signal. On reception of this command, the ONT immediately transmits the predefined digital ranging signal upstream to the OLT. Auto-correlation techniques and an automatic zero control circuit are used to allow recognition of the low-level digital sequence. Ranging inaccuracy obtained with this method is typically a few ATM cells.

The second step of this method performs fine ranging in accordance with the first method mentioned above. In particular, upstream transmission is briefly interrupted and large idle TDMA time slots are created to transmit ranging information. Fine ranging reduces the delay uncertainty to a few bits.

Unfortunately, both of the above-mentioned methods are not completely attractive solutions to the ranging problem. For example, the first method interrupts the transmission of information from the ONTs to the OLT of the central office. In particular, when creating a large idle TDMA time slot to carry ranging information, all ONTs connected to the network have to remain silent in order to avoid collisions with the ranging cell of the ONT to be ranged. As a result, additional buffers are needed at each of the ONTs to store information while the ranging process is taking place. In addition, during the quiet period a number of ATM cells also have to be buffered at the OLT side. Consequently, depending on how frequently this ranging procedure has to be executed, transmission capacity in both the downstream or the upstream direction can be seriously decreased. Further, the use of idle TDMA time slots in the downstream direction makes it more difficult to recover the clock signal at the ONTs. Finally, while the second method minimizes the interruption of the information flow, the use of auto-correlation techniques in the first step of the second method is a complex process that may require dedicated and expensive hardware to implement the coarse ranging function.

SUMMARY OF THE INVENTION

The present invention provides the designer of an TDMA-based passive optical network with additional flexibility in implementing the ranging function. In accordance with the invention, a superimposed low-level, single frequency, signal is used to determine the distance between the OLT and any ONT of a passive optical network.

In one embodiment of the invention, the OLT continuously superimposes a low-level, low frequency, ranging signal on top of the transmitted data signal that is sent from the OLT to each of the ONTs. This ranging signal is a sine wave with a frequency below the normal frequency spectrum for the data signal, and with a level below the normal data signal level. The normal frequency spectrum for the data signal is that required for correct reception of the data. A ranging command is sent by the OLT to a particular ONT. On reception of this command, that particular ONT starts the transmission of the received ranging signal back to the OLT. The phase difference at the OLT between the transmitted ranging signal and the ranging signal sent by the ONT is proportional to the distance between the OLT and that ONT.

In another embodiment of the invention, the OLT continuously superimposes a low-level, high frequency, ranging signal on top of the transmitted data signal from the OLT to each of the ONTs. A ranging command is sent by the OLT to a particular ONT. On reception of this command, the ONT starts the transmission of the received, ranging signal. This ranging signal is a sine wave with a frequency above the normal frequency spectrum for the data signal, and with a level below the normal data signal level. The time difference between the arrival of this ranging signal at the OLT and transmitted ranging command gives the total round trip time for this particular ONT. This provides a coarse measurement of the OLT-ONT distance. A finer measurement of the OLT-ONT distance can be obtained by the prior-art method discussed above.

In accordance with a feature of the invention, the ranging procedure can be carried out with minimal interference of the high frequency information transfer. In particular, the first embodiment does not even require the performance of a fine ranging step. In addition, both the first and second embodiments are easy and simple to implement.

DETAILED DESCRIPTION

Figure 1:
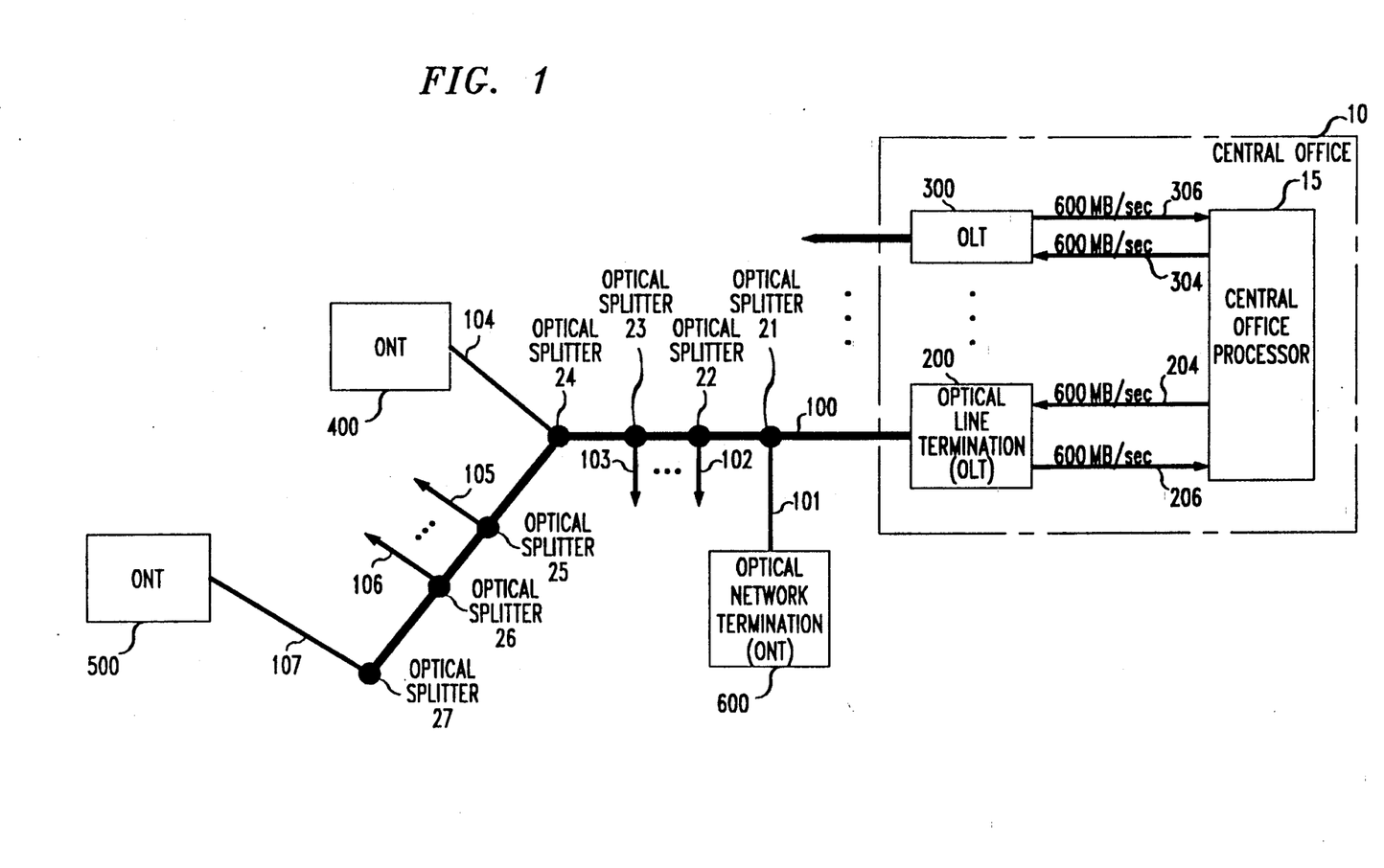
FIG. 1 is a block diagram of a passive-tree-and-branch optical communications system.

The block diagram of FIG. 1 shows an optical fiber communications network for use in the local loop plant. In particular, central office 10 interfaces to a number of optical local loop plants via representative OLTs 200 and 300. For simplicity, only the optical local loop connecting OLT 200 to ONTs 400, 500 and 600 is shown. This optical local loop is represented by optical fiber 100 and the various optical fiber branches that emanate from optical fiber 100. As illustration, ONT 400 connects to optical fiber 100 over optical branch 104 via optical splitter 24; ONT 500 connects to optical fiber 100 over optical branch 107 via optical splitter 27; and ONT 600 connects to optical fiber 100 over optical fiber 101 via optical splitter 21. It is assumed that the splitting factor at each branch, for each OLT-ONT path, is identical. The other optical branches shown in FIG. 1 illustrate that additional ONTs (not shown) can similarly be connected to the optical loop plant. This type of optical fiber loop is known in the art as a passive optical network with a tree-and-branch topology.

In the optical communications system of FIG. 1, it is assumed that the well-known ATM transmission format is used to transfer information in cells in both the downstream direction, i.e., from OLT 200 to ONTs 400, 500 and 600; and in the upstream direction, i.e., from each of the ONTs 400, 500 and 600, to OLT 200.

As described above, to avoid collisions in the upstream direction between the information-bearing ATM cells from ONTs 400, 500 and 600, each ONT must compensate for its path length, or time delay, from OLT 200. Typically, as is known in the art, the time delay to be used by each ONT is initialized by a Operation, Administration and Maintenance (OAM) command from OLT 200. For example, OLT 200 sends an OAM command to ONT 400 that specifies the amount of time delay to be used by ONT 400 relative to its clock before inserting its information-bearing ATM cells for upstream transmission to OLT 200. This clock should be an absolute time reference, which may very well be deduced from the received OLT data signal. In actuality, this OAM command is sent to a particular ONT in so-called dedicated "OAM cells." These OAM cells are inserted in the ATM stream for OAM purposes and have the same length as a normal ATM cell. Consequently, for simplicity, only ATM cells are hereinafter referenced as the underlying transmission format for transmitting data and commands to, and from, ONTs. However, in order for OLT 200 to determine the time delays for each ONT, OLT 200 must first perform a ranging function.

The present invention provides the designer of an TDMA-based passive optical network with additional flexibility in implementing this ranging function. In accordance with the invention, a continuously superimposed low-level, single frequency, signal is used to determine the optical path length, or time delay, between the OLT and any ONT of a passive optical network.

Figure 2:
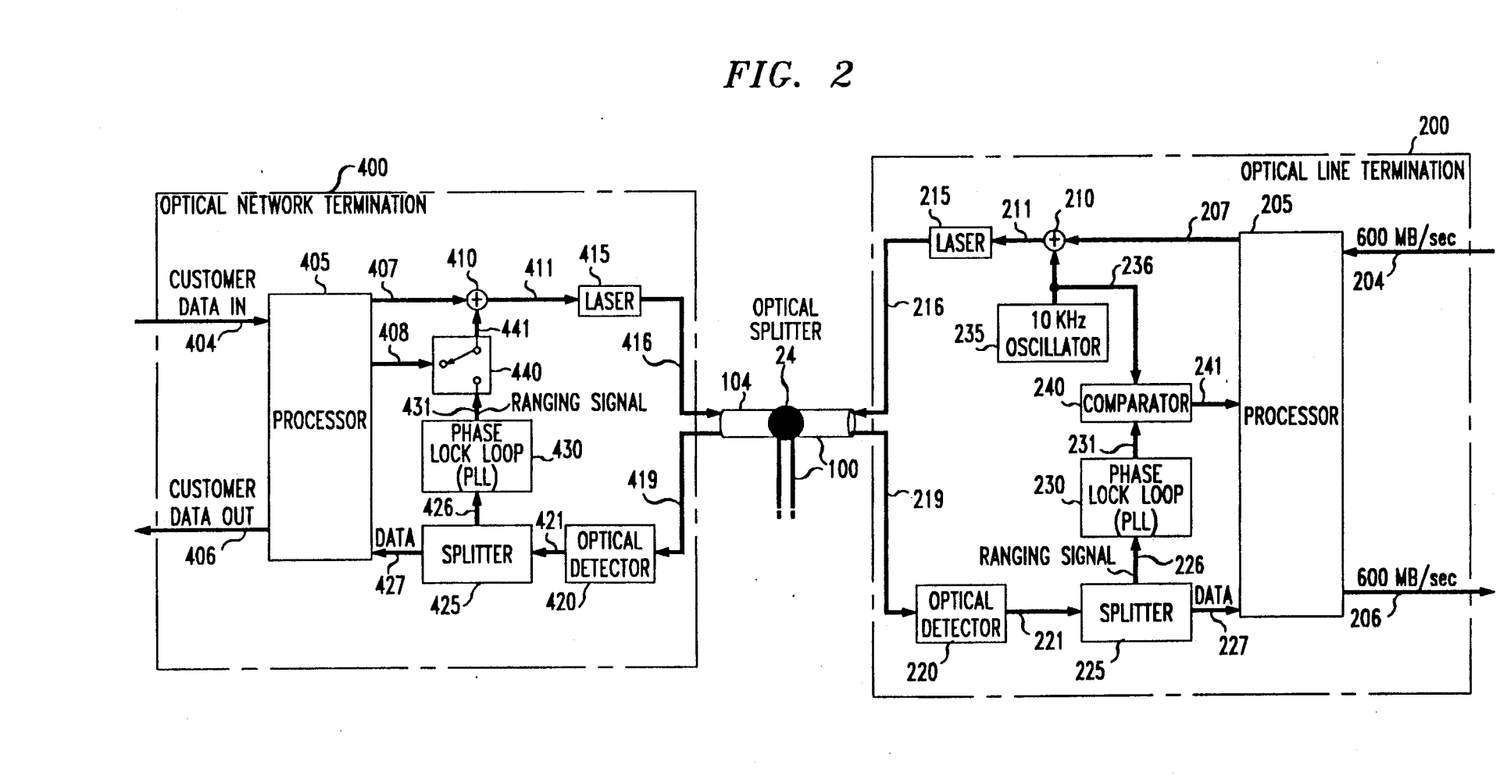
FIG. 2 is a block diagram of one embodiment of the invention in both an Optical Line Termination node and an Optical Network Termination node from the optical communications system of FIG. 1.

The block diagram of FIG. 2 shows a first embodiment of the invention for both OLT 200 and representative ONT 400. OLT 200 comprises processor 205, adder 210, laser 215, optical detector 220, splitter 225, phase locked loop (PLL) 230, oscillator 235, and comparator 240. Processor 205 represents a central processing unit, memory, etc., for transmitting and receiving streams of data using TDMA techniques in the ATM transmission format to the various ONTs. In particular, for downstream transmission to each of the ONTs, processor 205 receives a 600 Mbits/sec data stream from central office processor 15 via line 204 and provides an ATM formatted data stream to optical fiber 100 via adder 210 (discussed below) and laser 215. On the other hand, for upstream transmission from each of the ONTs to OLT 200, optical detector 220 receives an optical signal, representing an ATM formatted data stream, from optical fiber 100 and converts this optical signal to an electrical signal, which is then provided to splitter 225 (discussed below). The latter provides the received data stream to processor 205, which provides a 600 Mbits/sec data stream to central office processor 15, via line 206.

Similarly, as shown in FIG. 2, ONT 400 comprises processor 405, adder 410, laser 415, optical detector 420, splitter 425, phase locked loop (PLL) 430, and switch 440. Processor 405 represents a central processing unit, memory, etc., for transmitting and receiving streams of data in the ATM transmission format to the OLT 200. In particular, for upstream transmission to OLT 200, processor 405 receives a customer data input stream via line 404 from customer terminal equipment (not shown) and provides an ATM formatted data stream to optical fiber 104 via adder 410 (discussed below) and laser 415. On the other hand, for downstream transmission from OLT 200, optical detector 420 receives an optical signal, representing an ATM formatted data stream, from optical fiber 104 and converts this optical signal to an electrical signal, which is then provided to splitter 425 (discussed below). The latter provides the received data stream to processor 405, which provides a customer output data stream on line 406.

In accordance with the invention, OLT 200 performs a ranging function as follows. Oscillator 235, of OLT 200, generates a ranging signal that is a stable, single frequency, 10 KHz signal, which is applied to adder 210. This ranging signal is a low-level signal, which is a) at a frequency outside of the normal frequency spectrum for the data signal provided by line 207, and b) at a signal level below the normal data signal level provided by line 207. As used herein, the normal frequency spectrum of the data signal is that frequency band required for correct reception of the data. This ranging signal is combined, or added to, the data signal present on line 207 by adder 210. The latter provides the downstream data signal to laser 215, as described above, for transmission over the optical network. This downstream data signal is a composite data signal that comprises the data signal and the ranging signal. As can be seen from FIG. 2, the ranging signal is continuously transmitted by OLT 200 to each of the ONTs, as represented in FIG. 2 by ONT 400.

The ranging function is performed by OLT 200 by simply transmitting an OAM ranging command, via, as mentioned above, an ATM-like cell, to ONT 400. For this, it should be noted that a small amount of downstream information capacity is briefly required. At ONT 400, an electrical form of the downstream information signal, as described above, is provided by optical detector 420 to splitter 425. The latter is simply a filter that separates the received composite signal into the superimposed ranging signal and the incoming data signal, which is provided to processor 405. The superimposed ranging signal is provided to one terminal of PLL 430, which regenerates the ranging signal for application to switch 440. Here, phase locked loops are used to obtain high immunity against noise disturbances. Due to the excellent filtering characteristics of the phase locked loop, if well designed, the signal to noise ratio for the low-level ranging signal can be very high. Normally, switch 440 is open so that no signal is added to the signal present on line 407. However, when the ranging command is detected within the received data stream by processor 405, it merely closes switch 440, via line 408. Since this is a static ranging process, e.g., ONT 400 has just connected to the optical local loop, ONT 400 is not yet allowed to transmit data on line 407. In effect then, processor 405 blocks this data signal. As a result, only the ranging signal is now transmitted by ONT 400. (It can be observed that another switch can be used in place of adder 410 to achieve similar results). Adder 410 provides the ranging signal for upstream transmission. This ranging signal is received in OLT 200 by optical detector 220, which provides an electrical signal to splitter 225. It should be noted that OLT 200 receives a composite data signal comprising data streams from other ONTs and the ranging signal from ONT 400. Splitter 225 is simply a filter that separates the superimposed ranging signal from the received data signal, which is provided to processor 205. The superimposed ranging signal is provided to one terminal of PLL 230, which regenerates the ranging signal for application to comparator 240. The distance from OLT 200 to ONT 400 is a function of the phase difference between the received ranging signal from ONT 200 and the ranging signal generated by oscillator 235. This phase difference is provided by comparator 240 to processor 205.

The frequency of oscillator 235 is chosen as a function of the maximum distance between the OLT and any of the ONTs. In this example, it is assumed that the maximum distance between OLT 400 and ONT 200 will be less than 10 kilometers. Therefore, the maximum round trip time for a signal traveling from OLT 200 to ONT 400 and back will be less than 100 microseconds (this assumes a speed of light in the optical fiber of 20 cm/nanosecond). Consequently, the frequency of oscillator 235 is set to 10 KHz in order to maintain a one to one relationship between phase and distance. However, the frequency of oscillator 235 can also be set lower.

It should be noted that although a small amount of downstream information capacity was required to issue the ranging command to ONT 400, there was no interference with the upstream information capacity of other ONTs. Consequently, buffer requirements in both the OLT and ONTs are reduced. In addition, since large idle TDMA time slots in the downstream transmission signal are avoided, clock recovery in the ONT can simply be done by standard phase lock loop methods. Further, accurate ranging can be achieved (within a few bits of an ATM cell at 600 Mbits/sec.) and no separate static fine ranging procedure is necessary. This accuracy can be achieved due to the excellent filtering characteristics of the phase locked loop and the insensitivity of the phase comparison method to slight amplitude changes. In addition, accuracy can be further improved by designing comparator 240 using known digital counter techniques. Finally, dynamic ranging by OLT 200 using gap monitoring (mentioned above) is not necessary but may be desirable from an operational and maintenance point of view.

Figure 3:
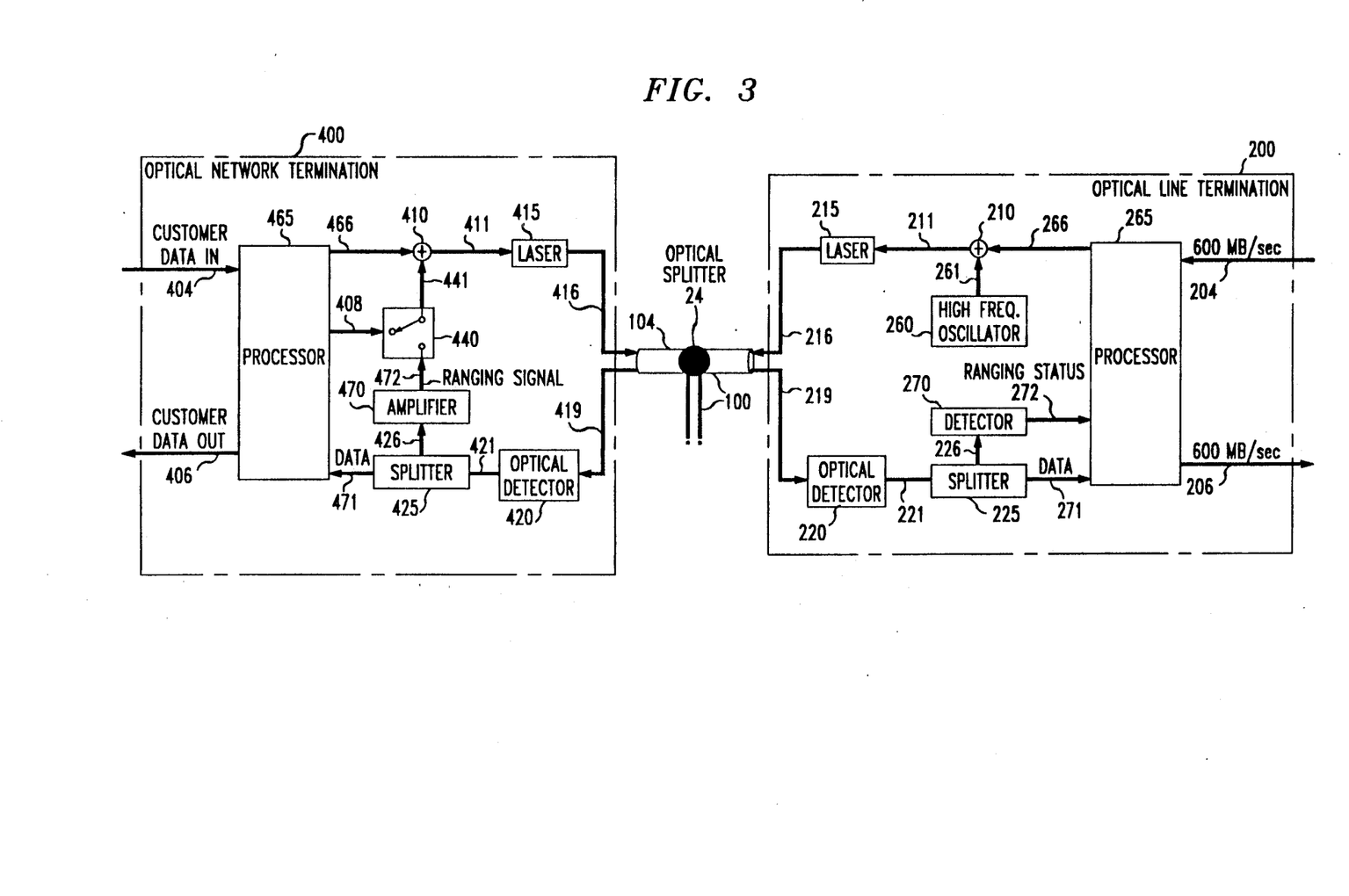
FIG. 3 is a block diagram of another embodiment of the invention in both an Optical Line Termination node and an Optical Network Termination node from the optical communications system of FIG. 1.

The block diagram of FIG. 3 shows another embodiment of the invention in both OLT 200 and ONT 400. OLT 200 comprises processor 265, adder 210, laser 215, optical detector 220, splitter 225, detector 270, and oscillator 260. Processor 265 represents a central processing unit, memory, etc., for transmitting and receiving streams of data using TDMA techniques in the ATM transmission format to the various ONTs. In particular, for downstream transmission to each of the ONTs, processor 265 receives a 600 Mbits/sec data stream from central office processor 15 via line 204 and provides an ATM formatted data stream to optical fiber 100 via adder 210 (discussed below) and laser 215. On the other hand, for upstream transmission from each of the ONTs to OLT 200, optical detector 220 receives an optical signal, representing an ATM formatted data stream, from optical fiber 100 and converts this optical signal to an electrical signal, which is then provided to splitter 225 (discussed below). The latter provides the received data stream to processor 265, which provides a 600 Mbits/sec data stream to central office processor 15, via line 206.

Similarly, as shown in FIG. 3, ONT 400 comprises processor 465, adder 410, laser 415, optical detector 420, splitter 425 and amplifier 470. Processor 465 represents a central processing unit, memory, etc., for transmitting and receiving streams of data in the ATM transmission format to the OLT 200. In particular, for upstream transmission to OLT 200, processor 465 receives a customer data input stream via line 404 from customer terminal equipment (not shown) and provides an ATM formatted data stream to optical fiber 104 via adder 410 (discussed below) and laser 415. On the other hand, for downstream transmission from OLT 200, optical detector 420 receives an optical signal, representing an ATM formatted data stream, from optical fiber 104 and converts this optical signal to an electrical signal, which is then provided to splitter 425 (discussed below). The latter provides the received data stream to processor 465, which provides a customer output data stream on line 406.

In accordance with the invention, OLT 200 performs a ranging function as follows. Oscillator 260, of OLT 200, generates a ranging signal that is a stable, single high frequency signal, which is applied to adder 210. This ranging signal is a low-level signal, which is a) a sinewave at a frequency outside of the normal frequency spectrum for the data signal provided by line 266, and b) at a signal level below the normal data signal level provided by line 266. This ranging signal is combined, or added to, the data signal present on line 266 by adder 210. The latter provides the downstream data signal to laser 215, as described above, for transmission over the optical network. This downstream data signal is a composite data signal that comprises the data signal and the ranging signal. As can be seen from FIG. 3, the ranging signal is continuously transmitted by OLT 200 to each of the ONTs, as represented in FIG. 3 by ONT 400.

The ranging function is performed by OLT 200 by simply transmitting an OAM range command, via, as mentioned above, an ATM-like cell, to ONT 400. For this, it should be noted that a small amount of downstream information capacity is briefly required. At ONT 400, an electrical form of the downstream information signal, as described above, is provided by optical detector 420 to splitter 425. The latter is simply a filter that separates the received composite signal into the superimposed ranging signal and the incoming data signal, which is provided to processor 465. The superimposed ranging signal is provided to one terminal of amplifier 470. The latter is simply a narrowband amplifier tuned at the frequency of the ranging signal which regenerates the ranging signal and applies it to switch 440, via line 472. Normally, switch 440 is open so that no signal is added to the signal present on line 466. However, when the ranging command is detected within the received data stream by processor 465, it merely closes switch 440, via line 408. Since this is a static ranging process, e.g., ONT 400 has just connected to the optical local loop, ONT 400 is not yet allowed to transmit data on line 466. In effect then, processor 465 blocks this data signal. As a result, only the ranging signal is now transmitted by ONT 400. (It can be observed that another switch can be used in place of adder 410 to achieve similar results). Adder 410 provides the upstream data signal, which is a composite data signal that comprises the outgoing data signal and the ranging signal. This upstream data signal is received in OLT 200 by optical detector 220, which provides an electrical signal to splitter 225. It should be noted that OLT 200 receives a composite data signal comprising data streams from other ONTs and the ranging signal from ONT 400. Splitter 225 is simply a filter that separates the superimposed ranging signal from the received data signal, which is provided to processor 265. The superimposed ranging signal is provided to detector 270. The latter is a narrowband amplifier that detects the presence of the ranging signal and provides a ranging status signal indicator on line 272 to processor 265. This ranging status signal is active whenever the low level ranging signal is detected by detector 270. The distance from OLT 200 to ONT 400 is a function of the time between when processor 265 issued the ranging command to ONT 440 and when detector 270 indicated, via line 272, the presence of the high frequency, low-level, ranging signal. The time difference between the arrival of this ranging signal at the OLT and the transmitted ranging command gives the total round trip time for ONT 400.

As noted above, the ranging signal is continuously transmitted by OLT 200, being superimposed on the normal data stream. However, ONT 400 only transmits this ranging signal if a ranging command is received from OLT 200. Upon receipt of the ranging command, OLT 400 turns on the high frequency ranging signal, giving a high frequency modulation of the transmitted light output of laser 415. The frequency of this high frequency ranging signal must lie above the frequency spectrum used for reception of normal data traffic. For a binary pulse modulated optical communication system a suitable ranging frequency is the bit-rate frequency. At that frequency the spectral content of the data signal is zero. Frequencies around and above that value do not contribute in a relevant way to data signal detection, while a high frequency ranging signal at the bit-rate frequency is not disturbed by the data signal. In this way the ranging procedure can be carried out without interfering with the information transfer. Scrambling or coding of the data signal is not necessary for this ranging method.

Expected inaccuracy of the ranging method shown in FIG. 3 is about some tens of bits at 600 Mbits/sec. This inaccuracy lies just in between the earlier mentioned coarse (resolution of a few ATM cells) and fine ranging (resolution of a few bits). After the ranging has been performed in accordance with the described invention, further fine ranging can be performed by using dedicated short ranging ATM cells. Because the ATM cell, used for fine ranging, can be allocated to the ONT to be ranged, normal data traffic to other ONTs can continue. Gap monitoring at OLT 200 is not necessary but may be desirable from an operational and maintenance point of view.

The foregoing merely illustrates the principles of the invention and it will thus be appreciated that those skilled in the art will be able to devise numerous alternative arrangements which, although not explicitly described herein, embody the principles of the invention and are within its spirit and scope.

For example, the high frequency ranging signal can be amplitude, frequency, or phase modulated by a periodic low frequency signal. Ranging information is no longer obtained by on-off switching of the high frequency ranging signal, but by measurements on the low frequency modulation signal. Appropriate modulation and demodulation techniques in the OLT can recover a time or phase relation between the transmitted modulation signal from the OLT and the received modulation signal from the ONT. Assuming a maximum distance between OLT and ONT of 10 kilometers, the maximum round trip time is 100 microseconds. The maximum modulation frequency is then 10 KHz to obtain a one to one relationship between phase and distance, as was used in the first embodiment described above. Accuracy will be enhanced by this method because phase locked loops can be applied with there excellent filter characteristics.

Another possibility is the application of a low frequency modulation signal with a variable frequency to the high frequency ranging signal. Measurement accuracy can be enhanced by increasing the modulation frequency above 10 KHz, while a one to one relationship between phase and distance is maintained by a measurement starting at 10 KHz.

Finally, there can be variations on the generation of the ranging signal. For example, in the embodiment of FIG. 3, oscillator 260, in OLT 200, can be omitted and moved to ONT 400, where it connects to line 472. As a result, splitter 425 and amplifier 470, in ONT 400, are removed and the data signal provided by optical detector 420 is applied to processor 465. Further, as long as the ranging signal is outside of the frequency spectrum of the data signal, it does it have to be a single frequency, nor does it have to be a low-level signal if system power constraints are not limiting. In addition, the ranging signal does not have to be continuously transmitted, but can be turned on and off in conjunction with a ranging command.

We claim:

1. Apparatus for use in an optical communications network, the apparatus comprising:
   means for receiving a composite data signal that includes a ranging signal and a data signal, the ranging signal comprising a single frequency signal, the data signal being generated by a plurality of sources in a time division multiple access format;
   means for separating the ranging signal from the composite data signal; and
   means for providing a phase difference between the separated ranging signal and a reference signal at the at least single frequency, the phase difference being proportional to the range to one of the plurality of sources.

2. The apparatus claim 1 wherein the ranging signal is a low-level signal, which is at a signal level below the signal level of the data signal.

3. Apparatus for use in an optical communications network, the apparatus comprising:
   means for receiving a composite data signal that includes a ranging signal and a data signal, the ranging signal comprising a single frequency signal, the data signal being generated by a plurality of sources in a time division multiple access format;
   means for separating the ranging signal from the composite data signal; and
   means for providing a detection signal responsive to the presence of the separated ranging signal; and
   means for processing the detection signal to provide an estimate of the range to one of the plurality of sources, the estimate of the range being a function of a time difference between receiving the detection signal and transmission of a range command to the one of the plurality of sources.

4. The apparatus of claim 3 wherein the ranging signal is a low-level signal, which is at a signal level below the signal level of the data signal.

5. Apparatus for use in an communications network, comprising:
   means for receiving a composite data signal that includes a ranging signal and a data signal, the ranging signal comprising a signal that is outside of the normal frequency spectrum of the data signal, the data signal representing a stream of data from a plurality of sources; and
   means for determining the range to one of the plurality of the sources as a function of the ranging signal.

6. The apparatus of claim 5 wherein the ranging signal is a low-level signal, which is at a signal level below the signal level of the data signal.

7. The apparatus of claim 6 wherein the ranging signal comprises at least a single frequency below the frequency spectrum of the data signal.

8. The apparatus of claim 7 wherein the means for determining includes a means for separating the ranging signal from the composite data signal.

9. The apparatus of claim 8 wherein the means for determining provides a phase difference between the separated ranging signal and a reference signal at the at least single frequency, the phase difference being proportional to the range to the one of the plurality of sources.

10. The apparatus of claim 6 wherein the ranging signal comprises at least a single frequency above the frequency spectrum of the data signal.

11. The apparatus of claim 10 wherein the means for determining includes
    means for providing a detection signal, which is representative of the presence of the ranging signal; and
    means for processing the detection signal to provide an estimate of the range to the one of the plurality of sources, the estimate of the range being a function of a time difference between receiving the detection signal and transmission of a range command to the one of the plurality of sources.

12. The apparatus of claim 5 wherein the communications network is a passive optical tree-and-branch network and the data signal from the plurality of sources is in a time division multiple access format.

13. The apparatus of claim 12 wherein the means for receiving converts an optical signal representing the composite data signal into an electrical signal representing the composite data signal.

14. Apparatus for use in an optical communications network, comprising:
   means for converting an optical composite signal into an electrical composite signal, the composite signal comprising an incoming data signal, representing a stream of data, and a low-level ranging signal that is a) outside of the frequency spectrum of the incoming data signal and b) at a signal level below the signal level of the incoming data signal;
   means for regenerating the ranging signal from the electrical composite signal;
   means responsive to ones of the data stream, represented by that portion of the electrical composite signal, for combining the ranging signal to an outgoing data signal; and
   means for optically transmitting the combined ranging signal and outgoing data signal.

15. A ranging method for use in an optical communications network, comprising the steps of:
   receiving a composite data signal that includes a ranging signal and a data signal, the ranging signal comprising at least single frequency signal that is below the frequency spectrum of the data signal, the data signal being generated by a plurality of sources in a time division multiple access format;
   separating the ranging signal from the composite data signal; and
   providing a phase difference between the separated ranging signal and a reference signal at the at least single frequency, the phase difference being proportional to the range to one of the plurality of sources.

16. The method of claim 15 wherein the ranging signal is a low-level signal, which is at a signal level below the signal level of the data signal.

17. A ranging method for use in an optical communications network, comprising the steps of:
   receiving a composite data signal that includes a ranging signal and a data signal, the ranging signal comprising at least a single frequency signal that is above the frequency spectrum of the data signal, the data signal being generated by a plurality of sources in a time division multiple access format;
   separating the ranging signal from the composite data signal; and
   providing a detection signal responsive to the presence of the separated ranging signal; and
   processing the detection signal to provide an estimate of the range to one of the plurality of sources, the estimate of the range being a function of a time difference between receiving the detection signal and transmission of a range command to the one of the plurality of sources.

18. The method of claim 17 wherein the ranging signal is a low-level signal, which is at a signal level below the signal level of the data signal.

19. A method for use in an communications network, the method comprising the steps of:
   receiving a composite data signal that includes a ranging signal and a data signal, the ranging signal comprising a signal that is outside of the frequency spectrum of the data signal, the data signal representing a stream of data from a plurality of sources in a time division multiple access format; and
   determining the range to one of the plurality of sources as a function of the ranging signal.

20. The method of claim 19 wherein the ranging signal is a low-level signal, which is at a signal level below the signal level of the data signal.

21. The method of claim 20 wherein the ranging signal comprises at least a single frequency below the frequency spectrum of the data signal.

22. The method of claim 21 wherein the determining steps includes the steps of:
   separating the ranging signal from the composite data signal; and
   providing a phase difference between the separated ranging signal and a reference signal at the at least single frequency, the phase difference being proportional to the range to the one of the plurality of sources.

23. The method of claim 19 wherein the ranging signal comprises at least a single frequency above the frequency spectrum of the data signal.

24. The method of claim 23 wherein the determining step includes the steps of:
   providing a detection signal, which is representative of the presence of the ranging signal; and
   processing the detection signal to provide an estimate of the range to the one of the plurality of sources, the estimate of the range being a function of a time difference between receiving the detection signal and transmission of a range command to the one of the plurality of sources.

25. A ranging method for use in an optical communications network, comprising the steps of:
   receiving a composite data signal that includes a ranging signal and a data signal, the ranging signal comprising a single frequency signal, the data signal being generated by a plurality of sources in a time division multiple access format;
   separating the ranging signal from the composite data signal; and
   providing a phase difference between the separated ranging signal and a reference signal at the at least single frequency, the phase difference being proportional to the range to one of the plurality of sources.

26. The method of claim 25 wherein the ranging signal is a low-level signal, which is at a signal level below the signal level of the data signal.

27. A ranging method for use in an optical communications network, comprising the steps of:
   receiving a composite data signal that includes a ranging signal and a data signal, the ranging signal comprising a single frequency signal, the data signal being generated by a plurality of sources in a time division multiple access format;
   separating the ranging signal from the composite data signal; and
   providing a detection signal responsive to the presence of the separated ranging signal; and
   processing the detection signal to provide an estimate of the range to one of the plurality of sources, the estimate of the range being a function of a time difference between receiving the detection signal and transmission of a range command to the one of the plurality of sources.

28. The method of claim 27 wherein the ranging signal is a low-level signal, which is at a signal level below the signal level of the data signal.

* * * * *